United States Patent [19]

Wolfrey

[11] 4,301,053
[45] Nov. 17, 1981

[54] POLYURETHANE RESIN COATING COMPOSITION

[75] Inventor: Austin A. Wolfrey, Peabody, Mass.

[73] Assignee: General Electric Company, Schenectady, N.Y.

[21] Appl. No.: 116,925

[22] Filed: Jan. 29, 1980

[51] Int. Cl.³ .............................................. C08L 75/04
[52] U.S. Cl. ..................... 260/29.2 TN; 260/29.6 NR; 428/412; 428/423.1; 428/423.7; 428/424.4; 428/425.8; 525/6
[58] Field of Search ............... 260/29.2 TN, 29.6 NR; 428/423.7, 425.8; 525/6

[56] References Cited

U.S. PATENT DOCUMENTS 3,632,556  1/1972  Pittman et al. ............. 260/29.2 TN
4,183,836  1/1980  Wolfe, Jr. .................. 260/29.2 TN Primary Examiner—Theodore E. Pertilla
Attorney, Agent, or Firm—Morgan, Finnegan, Pine, Foley & Lee

[57] ABSTRACT

Two-package waterborne polyurethane resin coating compositions which, when applied to a solid substrate produce an adherent, abrasion resistant coating thereon, are disclosed herein. The coating compositions essentially include a small amount of N-methylpyrrolidone to improve adhesion to non-polar thermoplastic substances and are prepared by providing a carboxyl group-containing polyurethane in aqueous dispersion and, optionally, a water dispersible acrylic, as a first part; and using a trifunctional aziridine compound to make the second part of the two package system.

11 Claims, No Drawings

POLYURETHANE RESIN COATING COMPOSITION

This invention relates to a protective coating composition. More particularly, it relates to a two-package polyurethane resin coating composition which, when applied to a substrate, forms a protective, abrasion-resistant, adherent coating thereon.

BACKGROUND OF THE INVENTION

At present, two-package solvent-based polyurethane coatings are widely used as coatings for substrates, such as metals, wood and plastics. These two-package solvent-base urethanes can be cured at room temperature or cured at relatively lower temperature. Such urethanes yield coatings with high levels of mar resistance and chemical resistance. They are so good that they often give more protection than is needed by the substrate. Because these coating compositions are made with organic solvents, which must be liberated into the atmosphere, they cause environmental problems which makes desirable a switch to non-toxic, e.g., aqueous-based compositions. Moreover, because the solvent-containing compositions are often reduced (i.e., thinned) with strong non-polar to medium polar solvents, they often attack and degrade plastic substrates to an undesirable degree. Non-polar thermoplastics, such as aromatic polycarbonates, e.g., of bisphenol-A and phosgene, or polyphenylene ethers, e.g., poly(2,6-dimethyl-1,4-phenylene)ethers, are capable of being dissolved and/or attacked by such non-polar solvents, and they can be distorted with excessive heat. From the foregoing it follows that ideal coating compositions should be water-based, fairly polar, and capable of curing at room temperature or only slightly higher temperatures.

A series of two-package waterborne polyurethanes meeting all three requirements has now been developed, and is the subject matter of this invention. The coating compositions are based on a prepolymerized polyurethane dispersed in water, the particles of the prepolymer having carboxyl and other ionic functional groups. These are further reacted with a trifunctional aziridine compound to yield a reactive composition which, when coated by conventional means on a substrate, produces a macro-polymeric coating with excellent chemical resistance and good durability. Good substrate protection can be achieved with these waterborne systems without the use of any organic solvent whatsoever. The coatings can also be formulated to include waterborne thermoplastic carboxylated acrylics, to reduce the amount of more expensive polyurethane, and without greatly affecting physical properties. In an essential aspect, to provide adhesion to non-polar plastic substrates, it is an essential feature of the invention to add to the composition a small, effective amount, e.g., 1–7% of N-methylpyrrolidone; Surprisingly, the plastic substrate is not at all degraded in so-doing.

Protective coatings for metals, bright or dull, are also needed. For example, bright metallized plastics, wherein small amounts of metal are vacuum sputtered or vacuum metallized over the plastic, now popular with the auto industry because of their light weight, need protective layers to prevent scratching and marring of the brilliant surface. Metal wheel covers (hub caps) also require protective coatings for their preservation and lasting beauty. In addition, protective coatings are widely used on the surfaces of rigid, formed thermoplastics.

DESCRIPTION OF THE INVENTION

According to the present invention there are provided two-package aqueous coating compositions comprising as
Part A
  (i) a carboxyl group-containing urethane prepolymer, said prepolymer being dispersed in
  (ii) a medium comprising predominantly water; and as
Part B
  a trifunctional aziridine compound, said compound being adapted to react with said urethane prepolymer to crosslink the same; and
a minor, effective amount of N-methylpyrrolidone, sufficient to enhance the adhesion of a coating prepared from such composition to a non-polar thermoplastic substrate.

Also contemplated are solid substrates having at least one surface coated with an aqueous coating composition as defined above.

Component A comprises an aqueous dispersion of a conventional carboxyl group-containing urethane prepolymer, such as made from a polyisocyanate and a polyol. Such are available commercially from a number of sources, such as Polyvinyl Chemicals, Inc., Wilmington, Mass. under the tradename Neorez, R-960.

Component B is a trifunctional aziridine compound, which is a derivative of ethyleneimine, having the formula:

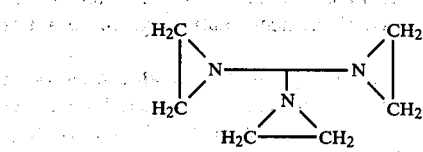

This is available from Cordova Chemical Co., Sacramento, Calif. under the tradename XAMA-7.

If desired, there can be added to Part A, a proportion, of up to 74.0% by weight, solids basis, of a thermoplastic carboxylated acrylic resin. Suitable commercial sources of such products are Rohm and Haas Co., Philadelphia, Penn., produce designation Rhoplex WL-91; Union Carbide Co., New York, N.Y. Ucar 4431 and Stanley Chemicals, Stacryl 200. Mixtures can also be used.

N-methylpyrrolidone, used in all of the embodiments, is commercially available.

Although water can be used exclusively, other polar liquid solvents can replace part of the water, e.g., for volatility control. Alcohols are suitable for such purposes, including lower aliphatic alcohols such as methanol, ethanol, propanol, isopropanol, such as methanol, ethanol, propanol, isopropanol, n-butyl alcohol and t-butyl alcohol. Mixtures of such alcohols can be used, too. The solids content of the coating compositions of this invention after mixing Parts A and B is generally preferred to be in the range of from about 30 to 45%, most preferably, about 40%, by weight of the total composition. The pH of the resultant coating composition is in the range of from about 7.8 to about 8.5, preferably higher than 7.5. If necessary, dilute base, such as ammonium hydroxide, can be added to the composition to adjust the final pH to this desired range.

Conventional additives and other modifying agents, such as thickeners, pigments, dyes, and the like, may be added to the composition at any time.

The coating compositions of this invention will cure on a substrate at temperatures of from 25° C. to about 93° C. and are applied within a short time after mixing, as is done with the conventional two-package organic solvent compositions.

The coating compositions of the present invention can be applied to a variety of solid substrates by conventional methods, such as flowing, spraying or dipping, to form a continuous surface film. Substrates which are especially contemplated herein are metals and solid or foamed, transparent, as well as non-transparent, plastics, wood, and the like. More particularly, the plastics can be synthetic organic polymeric substrates such as acrylic polymers, like poly(methylmethacrylate), polyesters, such as poly(ethylene terephthalate), poly(butylene terephthalate), etc., polyamides, polyimides, acrylonitrile-styrene copolymers, styrene-acrylonitrile-butadiene copolymers, polyvinyl chloride, butyrates, polyethylene and the like. As noted above, the coating compositions of this invention are especially useful as coatings for polycarbonates, such as those polycarbonates known as LEXAN, sold by General Electric Company, and for polyphenylene ethers and compositions thereof such as NORYL, sold by General Electric Company. The metal substrates on which the present protective coatings are utilized include bright and dull metals like aluminum and bright metallized surfaces like sputtered chromium alloy, and treated metals, such as Bonderites. Other solid substrates contemplated herein include painted wood surfaces, leather, glass, ceramics and the like.

A hard coating having all of the aforementioned characteristics and advantages is obtained by the removal of the solvent and volatile materials. The coating composition will air-dry to a tack-free condition, but heating in the range of 66° C. to 93° C., for 10 to 20 minutes is necessary to obtain final core.

In order that those skilled in the art may better understand how to practice the present invention, the following examples are given by way of illustration and not by way of limitation.

EXAMPLE 1

Part A is made by milling the following:

| Component | Parts by Weight |
| --- | --- |
| Carboxylated acrylic (42% solids in water) | 43.6 |
| Water | 3.7 |
| Green pigment package | 15.0 |
| Syloid 244 | 3.3 |

The milled product is rinsed with a small amount of water into a mixing vessel to which is added a premixture comprising

| Carboxylated urethane prepolymer (33% solids in water) | 21.3 |
| --- | --- |
| Carnauba wax | 2.1 |

The pH is adjusted to 7.8–8.2 with aqueous ammonia. To the mixture then is added a premix of

| Butyl cellosolve | 5.0 |
| --- | --- |
| N-methylpyrrolidone | 2.7 |

Viscosity is adjusted with a small amount of water and the composition is filtered. The carboxylated acrylic is a product of Rohm and Haas, Rhoplex WL-91; the Syloid 244 is a finely divided silica gel product of W. R. Grace Co.; the carboxylated urethane prepolymer is a product of Polyvinyl Chemicals, Inc., NeoRez R-960.

Part B comprises 100% by weight solids of a trifunctional aziridine compound sold by Cordova Chemical Co., trade designation XAMA-7.

To produce a coating, mix 92 parts of A and 2.0 parts of B, by weight, with agitation. Reduce with water to a #2 Zahn viscosity of 40±5 seconds and apply to a Bonderite B-100 surface by spraying. Permit the solvent to flash off for 10 minutes, then bake at 65° C. for 15 minutes. The cured film is green with a pencil hardness of F+, a Gardner Gloss of 10±2, and an adhesion by cross-hatch of 95%+. Impact, both reverse and direct is greater than 160 inch pounds.

The coating is remarkably adherent to non-polar thermoplastic substrates, such as the aromatic polycarbonate of bisphenol-A and phosgene, and to compositions containing poly(2,6-dimethyl-1,4-phenylene)ether. Adhesion to these substrates is directly dependent upon the amount of N-methylpyrrolidone added.

EXAMPLE 2

Part A is made by milling the following:

| Component | Parts by Weight |
| --- | --- |
| Carboxylated acrylic (42% solids in water) | 41.8 |
| Water | 3.4 |
| Black pigment package | 3.7 |
| Syloid 244 | 3.5 |

The milled product is rinsed with a small amount of water into a mixing vessel to which is added a premixture comprising

| Carboxylated acrylic (42% solids in water) | 5.5 |
| --- | --- |
| Carboxylated urethane (33% solids in water) | 16.2 |
| Carnauba wax | 1.9 |
| Polyethylene (40% solids in) | 1.9 |
| Acrylic polymer (Stacryl 200) | 6.5 |

The pH is adjusted in 7.8 with aqueous ammonia. To the mixture then is added a premix of

| Propylene glycol | 4.4 |
| --- | --- |
| Butyl cellosolve | 6.6 |
| N-methylpyrrolidone | 1.4 |

The sources of the components are as set forth in Example 1.

Part B comprises 100% by weight solids of a trifunctional aziridine compound sold by Cordova Chemical Co., trade designation XAMA-7.

To produce a coating, mix 89 parts by weight of Part A with 1.9 parts of Part B and reduce the viscosity with water to Zahn #2, 23 seconds. Apply to Bonderite B-1000, air dry 10 minutes, then bake at 74° C. for 15 minutes to produce a 1 mil. thick film, having a pencil hardness of F, a Gardner gloss of 10±2 units and a cross-hatch adhesion of 100%. Impact both reverse and direct is 160 inch-lbs.

Obviously, other modifications and variations of the present invention are possible in the light of the above teachings. It is therefore to be understood that changes may be made in the particular embodiments described above which are within the full intended scope of the invention as defined in the appended claims.

I claim:

1. A two-package aqueous coating composition comprising as

Part A
   (i) a carboxyl group-containing urethane prepolymer, said prepolymer being dispersed in
   (ii) a polar liquid medium comprising predominantly water; and as Part B
   a trifunctional aziridine compound, said compound being adapted to react with said urethane prepolymer to cross-link the same; and a minor, effective amount of N-methylpyrrolidone, sufficient to enhance the adhesion of a coating prepared from such composition to a non-polar thermoplastic substrate.

2. A coating composition as defined in claim 1 wherein the amount of N-methylpyrrolidone comprises from about 1 to about 7 parts by weight per 100 parts by weight of the total composition.

3. A coating composition as defined in claim 1 wherein Part A also includes up to 74.0% by weight, solids basis, of (iii) a water dispersible thermoplastic carboxylated acrylic polymer.

4. An article comprising solid substrate having at least one surface coated with the aqueous coating composition of claim 1.

5. An article as defined in claim 4 wherein the solid substrate is comprised of a synthetic organic polymer.

6. An article as defined in claim 5 wherein said polymer is an aromatic polycarbonate or a polyphenylene ether.

7. An article as defined in claim 4 wherein said solid substrate is a metal.

8. An article as defined in claim 5 wherein said polymer is a foamed polymer.

9. An article as defined in claim 6 wherein said aromatic polycarbonate is a poly(bisphenol-A carbonate).

10. An article as defined in claim 6 wherein said polyphenylene ether is poly(2,6-dimethyl-1,4-phenylene)ether.

11. An article as defined in claim 6 wherein the aqueous coating composition has been cured on said surface of said solid substrate.

* * * * *